(12) United States Patent
Gazdik et al.

(10) Patent No.: US 6,301,708 B1
(45) Date of Patent: Oct. 9, 2001

(54) SOFTWARE INSTALLATION PROCESS USING ABSTRACT DATA AND PROGRAM FILES

(75) Inventors: Charles J. Gazdik; Kelli Kinkela; David Martz, all of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/191,257

(22) Filed: Nov. 12, 1998

(51) Int. Cl.[7] .................................................... G06F 9/445

(52) U.S. Cl. ................................ 717/11; 717/1; 707/203

(58) Field of Search ............................... 717/11; 707/200, 707/203, 204, 205; 709/221; 710/5

(56) References Cited

U.S. PATENT DOCUMENTS

| | | | | |
|---|---|---|---|---|
| 5,247,683 | * | 9/1993 | Holmes et al. ....................... | 709/221 |
| 5,684,996 | * | 11/1997 | Westerholm et al. .................. | 717/11 |
| 5,805,897 | * | 9/1998 | Glowny ................................. | 717/11 |
| 5,812,472 | * | 8/1998 | Lawrence et al. .................... | 365/201 |
| 5,862,325 | * | 1/1999 | Reed et al. ............................ | 709/221 |
| 5,875,247 | * | 2/1999 | Nakashima et al. .................. | 705/52 |
| 5,881,236 | * | 3/1999 | Dickey ................................. | 709/221 |
| 5,930,513 | * | 7/1999 | Taylor ................................... | 717/11 |
| 5,966,540 | * | 10/1999 | Lister et al. .......................... | 717/11 |
| 6,016,400 | * | 1/2000 | Day et al. ............................. | 717/11 |
| 6,023,586 | * | 2/2000 | Gaisford et al. ..................... | 717/11 |
| 6,044,373 | * | 3/2000 | Gladney et al. ..................... | 707/10 |
| 6,047,129 | * | 4/2000 | Frye ..................................... | 717/11 |
| 6,131,192 | * | 10/2000 | Henry ................................... | 717/11 |
| 6,151,708 | * | 11/2000 | Pedrizetti et al. ..................... | 717/11 |
| 6,167,567 | * | 12/2000 | Chiles et al. ......................... | 717/11 |
| 6,205,527 | * | 3/2001 | Goshey et al. ....................... | 711/162 |

OTHER PUBLICATIONS

Hall et al, "A cooperative approach to support software deployement using software dock", ACM ICSE, pp 174–183, 1999.*
Green, "Component based software development implication for documentation", ACM pp 159–164, Apr. 1999.*

* cited by examiner

Primary Examiner—Mark R. Powell
Assistant Examiner—Anil Khatri

(57) ABSTRACT

A method for installing and uninstalling software which fragments the process so that the installation or uninstallation of each component of a software suite is controlled by multiple independent files, rather than by a single script. Each software component has associated therewith a unique component-specific data file which is independent of and external to the installer-processing engine, the suite installation process flow, and the other software components. Each such data file contains the characteristics of the software component, as well as the commands to be executed for installation and unexecuted during uninstallation. The flow of the installation/uninstallation process is controlled by a separate process-control file which is read and executed by the install/uninstall processing engine, which for a preferred embodiment of the invention, is a state machine. Fragmentation of the installation process in this manner isolates the intelligence required to install and uninstall a specific software component, thereby separating installation flow information from component installation information. As a component data file may reside at any accessible location, component data files that were not in existence at the time the original software distribution package was created can be supplied with new or updated software components via the Internet so that those components can be integrated into an existing software suite at installation run time.

21 Claims, 3 Drawing Sheets

SOFTWARE INSTALLATION PROCESS USING ABSTRACT DATA AND PROGRAM FILES

This application is related to co-pending application Ser. No. 09/191,262, titled MANUFACTURE OF SOFTWARE DISTRIBUTION MEDIA PACKAGES FROM COMPONENTS RESIDENT ON A REMOTE SERVER SOURCE, which was filed on Nov. 12, 1998.

FIELD OF THE INVENTION

This invention relates to software programs used to install and uninstall components of customizable application software programs which may include multiple interrelated modules. It also relates to methods for updating already installed application software programs via the Internet.

BACKGROUND OF THE INVENTION

Installation programs allow an end user to customize the installation of an application software program so that it is optimized for his particular computer system and so that it best meets his perceived needs within the constraints imposed by his computer system. The process typically proceeds in the following manner: the installation program engages in a dialog with the user by presenting him with a series of screen displays, each of which requests that he select one of several available installation options. As a consequence of such dialog, the installation program defines a unique set of installation steps which are followed in setting up the application program on the user's computer system. The steps generally specify the mass storage device to which application files will be copied, and are also likely to define a subset of available application modules which will be copied. The installation steps may also set operating system configuration parameters. Typically, such an installation process is encapsulated in what is known in the software industry as a script file. The installation program's installer-processing engine reads the script file, displays the dialog screens to the user in the order listed in the script file, and proceeds with the installation, a step at a time, as mandated by the user's response to each of the dialog screens.

There are several drawbacks to the installation process heretofore described. One drawback is that script files are generally hand written, which makes the process prone to error. A further drawback is difficulty posed by the need to test and debug code external to the script during the install/uninstall process. Developers often have a need to write such code, which when executed, performs tasks useful during the development process.

An even more serious drawback related to script-based installation programs is that the installation of a multiple-component application program is tied to a single script file. Thus, the system configuration steps, the component selection steps, the screen dialogs presented to the user, and the installation process flow are all interrelated. Modification of any aspect of the installation process would almost certainly require a rewriting of the script file. Because of the interrelated nature of the script-based installation process, changes to one part of the script file may have a ripple effect on the entire installation process, making rewriting the script file a complicated and tedious task.

Another serious drawback is that the installer-processing engine has access to only the features or functionality provided in the script file. Thus, modifications to the installation process which are not defined in the script file, such as modifying existing components in an undefined manner, replacing an already installed component with an updated component, or adding one or more new components would, most likely, be impossible without a complete rewriting of the script file.

Another drawback of script-based installation technology is the need to include, within the script file, logic that is used to determine whether or not a particular component is installed, as well as logic that will determine which configuration settings should be made. Installation criteria logic may also be employed to determine whether or not a particular software component can be installed on a particular operating system, or whether or not a specific configuration setting already exists.

A final limitation of the current script-based installation programs is their inability to download updated components from the Internet. Current installer technology does not support integrated installation over the Internet, nor does it support the addition of new software at run time.

Uninstallation of the application software is beset by many of the same limitations which affect installation. Uninstallation programs also employ a script file, which is read by an uninstaller-processing engine. Generally speaking, uninstallation of a complex, multi-component software package is limited to uninstalling all of the installed components. Though there are situations that require the removal of only a portion of installed components, the current script-based technology does not support partial uninstallations.

SUMMARY OF THE INVENTION

This invention is a method for installing and uninstalling software which fragments the process so that the installation or uninstallation of each component of a software suite is controlled by multiple independent files, rather than by a single script file. Each software component has associated therewith a unique component-specific data file which is independent of and external to the installer-processing engine, the suite installation process flow, and the other software components. Each component-specific data file contains not only the installation criteria that is used to determine whether or not a software component is installable on a particular computer system, and how to optimize installation of the component on a particular system, but also the command sequences which must be executed for installation and unexecuted during uninstallation. The flow of the installation/uninstallation process is controlled by a separate process-control file which is read and executed by the install/uninstall processing engine. Fragmentation of the installation process in this manner isolates the intelligence required to install and uninstall a specific software component, thereby separating installation flow information from component installation information. Since the installation of individual software components is no longer tied to the installation process flow, the installer-developer can change the installation flow without affecting information related to individual software components. Likewise, the characteristics of individual software components can be modified without risking corruption of the install/uninstall process flow. Gone is the need to recompile or rebuild an installation package because the information required to perform an install or uninstall is stored in separate data files, outside of the core install/uninstall processing engine. A component data file may reside at any accessible location, which makes integrated installation from a remote server accessible over the Internet feasible. Component data files that were not in existence at the time the original software distribution package was created can be supplied with new or updated software components via the Internet so that those components can be integrated into an existing software suite at installation run time.

The new installation process has been developed using Object Orientated Analysis and Design (OOAD) in a C++ programming language environment. Both the component-specific data files and the process-control files are represented as a hierarchy of objects. Objects which access other related objects which are lower in the hierarchy are designated an abstract base class. The component-specific data files are represented as a hierarchy of persistent objects, while the process-control file is represented as a hierarchy of state objects. The latter file is executed by a state machine which functions as the install-uninstall processing engine.

DETAILED DESCRIPTION OF THE INVENTION

A new method for installing and uninstalling software is provided which fragments the process so that the installation or uninstallation of each component of a software suite is controlled by multiple independent files, rather than by a single script file. Each software component has associated therewith a unique component-specific data file which is independent of and external to the installer-processing engine, the suite installation process flow, and the other software components. Each such data file contains the characteristics of the software component, as well as the commands to be executed for installation and unexecuted during uninstallation. The flow of the installation/uninstallation process is controlled by a separate process-control file which is read and executed by the install/uninstall processing engine, which for a preferred embodiment of the invention, is a state machine. Fragmentation or abstraction (as it may also be called) of the installation process in this manner isolates the intelligence required to install and uninstall a specific software component, thereby separating installation flow information from component installation information. This new technology facilitates the addition of new functionality to an existing software suite during the software development stage, as well as subsequent to the creation of the distribution media.

Figure 1:
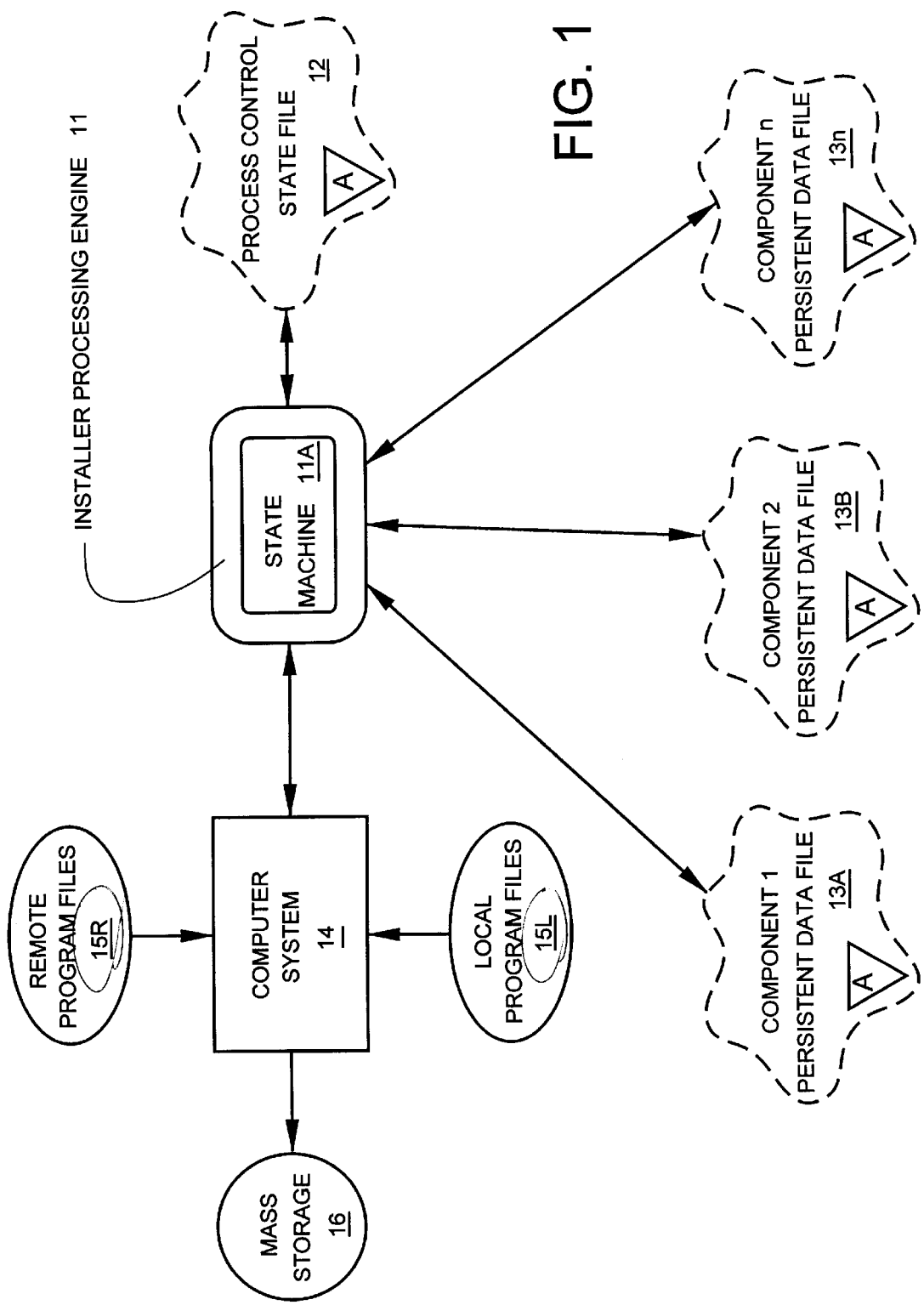
FIG. 1 is a diagrammatic summary of the invention.

The new installation process has been developed using Object Orientated Analysis and Design (OOAD) in a C++ programming language environment. Both the component-specific data files and the process-control files are represented as objects. The component-specific data files are represented as persistent objects. The term persistent refers to a unique type of C++ object that is capable of saving itself to a mass storage device. When called upon at a later time, the saved object is cable of restoring itself, including all related child members. Each component persistent data file contains the characteristics of the software component, as well as the commands to be executed for installation and unexecuted during uninstallation. The process-control file, which is represented as a state object, is executed by a state machine which functions as the install-uninstall processing engine. This process is represented diagrammatically in FIG. 1. An installer processing engine 11, which includes a state machine 11A, runs on a computer system 14. The process flow of a state machine 11 is controlled by a process control state file 12. The process control state file 12 directs the state machine 11 to call on the component persistent data files 13A, 13B. . . 13n in an ordered sequence. Each of the persistent data files 13A–13B provides the state machine 11 with the information required to install/uninstall a single software component, which are identified as component 1, component 2, and component n. This information is used to control a computer system 14, which installs a selected collection of uninstalled program files belonging to a software suite, which may include either local uninstalled program files 15L or remote uninstalled program files 15R, on a connected mass storage device 16.

Because installation information for a specific software component resides in a component persistent data file, the manner in which a software component is installed can be changed with relative ease and rapidity, without affecting the install flow or how other software components are installed. Additionally, the installer/developer need not define a separate uninstall process, as the uninstall process is the reverse of the install process. The install/uninstall processing engine need simply unexecute the installation steps. A related advantage of the new install/uninstall process is that the install and uninstall process is driven by the same engine, allowing the installer/developer to change the install and uninstall flow by simply modifying the existing process control state object file or providing a new process control state object file. The install/uninstall state object file is, of course, completely independent of the software components which are being installed or uninstalled. State object files are generally modified using a State Transition Editor, which by ensuring the integrity of the data file, greatly reduces the chances that defects will be introduced into the process sequence—a common problem during the manual modification of script files.

This new installation technology has another significant advantage over script-based installation technology. Component persistent data files and the state file which controls the entire software installation process can reside at any accessible location, whether it be a local storage device or a remote server. Thus, a seamless integration of both local and remote software components is now possible. For example, with access to the Internet during software installation, the install process becomes a dynamic installation vehicle that modifies how any software component is installed. In addition to being able to modify the install flow or add new or modified software components at run time by downloading a new state file or a new component persistent data file from the remote server, the installer engine itself can be updated as well, by simply downloading a new installer engine version from the remote server over the Internet. Only the new and updated files need be downloaded from the remote server, thereby minimizing the amount of information that must be downloaded from the remote server.

As previously stated, the new installation technology was developed, using OOAD, by breaking down the install/uninstall process and defining each task as an object. Each object has unique responsibilities with respect to the process. A detailed discussion of state objects will now be undertaken. Persistent objects will be subsequently dealt with.

Figure 2:
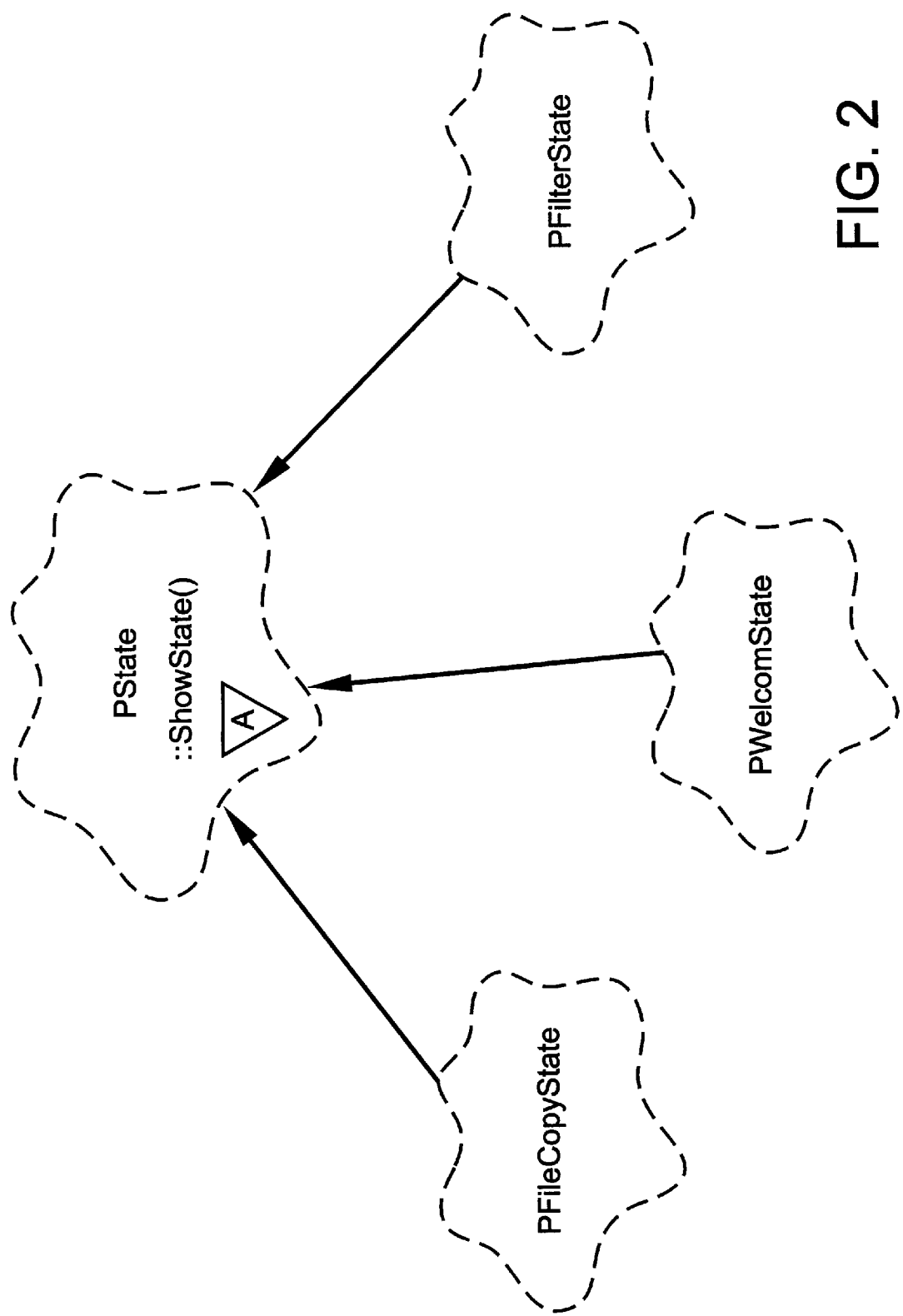
FIG. 2 depicts a hierarchy of some of the state objects utilized in a representative install/uninstall process.

State objects are files which execute specific tasks within the install/uninstall flow. Each state object is defined as a C++ class. FIG. 2 depicts a hierarchy of some of the state objects utilized in a representative install/uninstall process. Each abstract base class is identified by a downwardly-pointing equilateral triangle which encloses the letter "A". A state machine loads and runs each state object. The state may be displayed to the end user if that type of functionality is specified by the state object. Each state object defines a transition table in the state file, which the state machine reads and processes to produce a return code. The state machine transitions from that state object to another by evaluating the return code. Each state object has a specific task. For example, it may prompt the end user to provide a directory name and location; it may ask the user to identify those software components which he desired to install; or it may make one of many other install/uninstall-related queries. The functionality of a state object is defined by its ::ShowState() method, which the state machine calls and executes. A new state can be added as a derivative of the PState object. By overriding the ::ShowState() method. This new state can provide any functionality that is needed for an install or uninstall process. The architecture provided by the present invention facilitates the addition of new install/uninstall state functionality.

The state machine, which functions as the install/uninstall engine, must have knowledge of a state object before it can create and load the state from the state file. The state machine is programmed to recognize a default set of states that provide the necessary functionality to install and uninstall many different types of software components. Some states are generic in their functionality. For example, displaying a dialog to the end user and waiting for a user response is such a generic state. The fact that generic states can be reused repeatedly during the install process helps eliminate redundant logic that would be required in a script-based installer.

Figure 3:
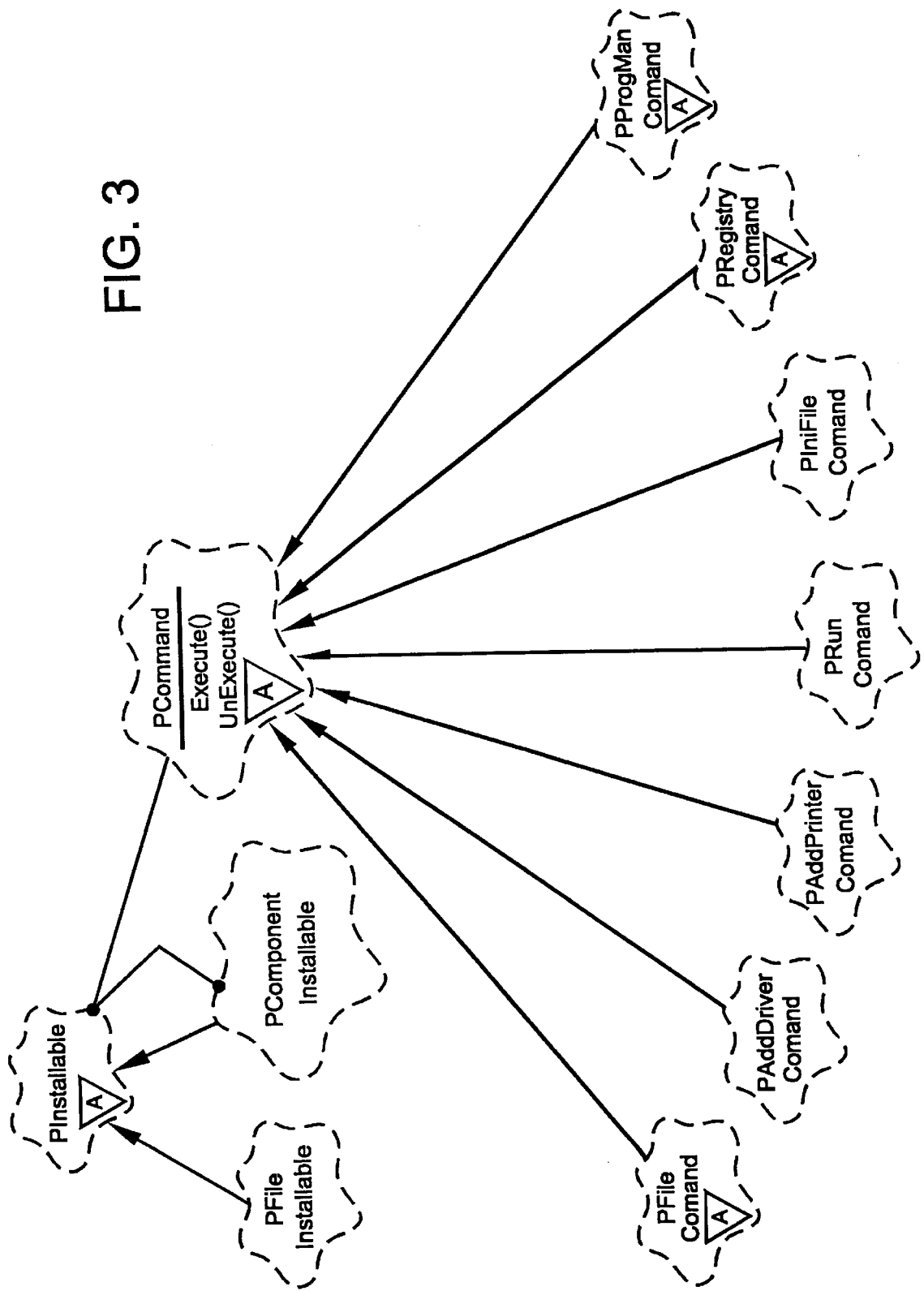
FIG. 3 depicts a hierarchy of some of the software component persistent objects utilized in a representative install/uninstall process.

As previously stated, a persistent object is a unique type of C++ object that, once saved as a file by one system, is capable of restoring itself, including all related child members, when called on by either the same system or a different system. The importance of such an object lies in its ability to completely and faithfully regenerate a previously existing object structure. FIG. 3 depicts a hierarchy of some of the software component persistent objects utilized in a representative install/uninstall process.

Software components are nothing more than a collection of physical files which, when installed and properly configured on a user's computer system, provide some particular functionality, service, or act as an interface to a device connected to the user's computer system. In the context of the present invention and with reference to FIG. 3, a software component is referred to as a PComponentInstallable object, which derives from a PInstallable object which, in turn, derives from an MPersistent object that provides the basic persistent functionality. The PInstallable object refers to something that can be installed on a user's computer system. This something can be a physical file or a collection of files that constitute the logical software component. The PComponentInstallable object represents the logical software component that can be installed on the computer system. It can include physical files requiring installation, which are represented by PFileInstallable objects, as well as configuration settings that must be made before the software component will function property. The PCommand persistent object represents these software configuration settings at the base class level.

Still referring to FIG. 3, PCommand and PInstallable objects are both abstract objects that define the fundamental building blocks of this installation process architecture. Any object that derives from the PInstallable object also has a list of PCommand objects, which tell the install engine which tasks must be executed during the install process, as well as unexecuted during the uninstall process. Command objects which derive from Pcommand, are those which do the work of copying files, adding or deleting registry values, renaming files, and executing files which install or uninstall a software component. Some tasks, such as copy a file, or add a registry key and value, are required by every installation process. The functionality provided by these two particular tasks is encapsulated in the respective command objects (PCopyFile) and (PAddValueRegistry). Though not shown in the hierarchy of FIG. 3, the object PcopyFile is derived from the abstract base class PFile Command. Likewise, PAddValueRegistry is derived from the abstract base class PRegistry Command. Because PCommand provides the method declarations for ::Execute() and ::UnExecute(), each of the derived command objects incorporates those same method declarations. The ::Execute() method is called during installation, while the ::Unexecute() method is called during uninstallation.

Persistent objects also contain conditional information that is used by the install/uninstall engine to determine how a PInstallable object will be installed and if and when a PCommand object will be executed during installation or unexecuted during uninstallation. These install/uninstall conditions (PInstallCondition) also derive from the MPersistent object so that the install conditions can be saved with the software components in the component persistent data file. The install conditions tell the install engine what operating system is required, user type and permissions, and various other types of conditional installation criteria that must be met before any PCommand can be executed or any PInstallable can be installed on a user's machine.

In addition to the installation criteria which determines if and when something can be installed, the PCommand object also contains a member that is used to determine at what point in the install or uninstall process it can call the ::Execute() or ::UnExecute() methods. It is called the Priority member, because this member determines the priority of the command during the install and uninstall process. A priority value can range between 0 and 100, with 0 being assigned to those commmands which will be called first, and 100 being assigned to those commands which have the least priority. The Priority member thus provides the developer with the ability to apply some sequencing logic to the install and uninstall processes, without having to modify any code or scripts.

Another member of the P Command object allows the install program developer to specify whether a command is meant for both normal installation and uninstallation processes, or is exclusive to the install process, or to the uninstall process. For a normal install process, the command ::Execute() method is called; for a normal uninstall process the command ::Un Execute() method is called. The other values provide the installer/developer with the ability to limit or refine the functionality of an uninstall or install process, by removing a call to ::Execute() during uninstallation and to ::UnExecute() during installation. This adds a second level of logic encoding into the persistent command objects, which doesn't require the installe/developer to write any additional code or script logic to handle these special conditions.

As can be appreciated from the foregoing explanation, the new install/uninstall process provides a robust, flexible architecture that can be adapted to meet any future installation/uninstallation task. Since the installation of individual software components is no longer tied to the installation process flow, the installer-developer can change the installation flow without affecting information related to individual software components. Likewise, the characteristics of individual software components can be modified without risking corruption of the install/uninstall process flow. Gone is the need to recompile or rebuild an installation package because the information required to perform an install or uninstall is stored in separate data files, outside of the core install/uninstall processing engine. A component data file may reside at any accessible location, which makes integrated installation from on a remote server accessible over the Internet feasible. Component data files that were not in existence at the time the original software distribution package was created can be supplied with new or updated software components via the Internet so that those components can be integrated into an existing software suite at installation run time.

Although only a single embodiment of the invention has been heretofore described, it will be obvious to those having ordinary skill in the art that changes and modifications may be made thereto without departing from the scope and the spirit of the invention as hereinafter claimed.

What is claimed is:

1. A process for installing a software suite on a mass storage device of a computer system, said software suite having multiple software components, said process comprising the steps of:

providing a component-specific data file for each software component, each such data file containing install information, install logic, and install commands required to install its associated software component from a collection of uninstalled suite program files;

providing a process control file that is independent of the component-specific data files, said process control file containing information which permits the ordered accessing of the component-specific data files; and providing a processing engine which executes the process control file.

2. The process of claim 1, wherein said process control file is a state file, and said processing engine includes a state machine.

3. The process of claim 2, wherein each component-specific data file is a component persistent data file.

4. The process of claim 3, wherein said state file comprises a collection of state objects which jointly define the flow of the install process, each of said state objects defining a single step of said process flow.

5. The process of claim 4, wherein each state object, when executed by the state machine, provides a return code which directs the state machine to transition to a succeeding state object in the process flow.

6. The process of claim 5, wherein said collection of state objects also jointly define the flow of an uninstall process, which is the exact reverse of the install process.

7. The process of claim 6, wherein each component persistent data file comprises a collection of component persistent objects, each of which defines either a particular characteristic of the associated software component or a command required for the installation and uninstallation of the associated software component.

8. The process of claim 7, wherein a single processing engine is used for installation and uninstallation, said processing engine calling on state objects, which control the installation/uninstallation process flow, and said state objects calling on the persistent objects, which carry out the install/uninstall commands.

9. The process of claim 8, wherein each component persistent data file includes a priority member, which determines the priority of commands employed during the install and uninstall process.

10. The process of claim 8, wherein said process control file and at least one component persistent data file reside on a remote server accessible over a computer network.

11. A process for installing a software suite on a computer system, said software suite having multiple software components, said process comprising the steps of:

providing a component-specific data file for each software component, each such data file represented as a hierarchy of persistent objects, said hierarchy of persistent objects containing install information, install commands, and install logic that performs the installation of the represented software component;

providing a process control file that is independent of the component-specific data files, said process control file being represented as a hierarchy of state objects, said hierarchy of state objects containing information which calls out the ordered accessing of the component-specific data files; and providing a state machine which executes the process control file.

12. The process of claim 11, wherein each state object, when executed by said state machine, provides a return code to the state machine which directs the machine to transition to a succeeding state object in the process flow.

13. The process of claim 12, wherein said hierarchy of state objects also jointly define the flow of an uninstall process, which is the exact reverse of the install process.

14. The process of claim 13, wherein each component persistent data file includes a priority member, which determines the priority of commands employed during the install and uninstall process.

15. The process of claim 14, wherein said process control file and at least one component persistent data file reside on a remote server accessible over a computer network.

16. A computer program product for installing an application software suite on a computer system, said application software suite having multiple interrelated software components, said computer program product embodied on a computer-readable medium and comprising code, executable by the computer system, that includes:

a component-specific data file associated with each software component, each such data file containing install information, install logic, and install commands required to install its associated software component;

a process control file that is independent of the component-specific data files, said process control file containing information which controls the ordered accessing of the component-specific data files; and an installer processing engine which executes the process control file.

17. The software program product of claim 16, wherein each component-specific data file is represented as a hierarchy of persistent objects.

18. The software program product of claim 17, wherein said process control file is represented as a hierarchy of state objects, said hierarchy of state objects providing the necessary functionality for installation and uninstallation of the various software components.

19. The software program product of claim 18, wherein said processing engine is a state machine.

20. The software program product of claim 19, wherein each state object, when executed by the state machine, provides a return code to the state machine which directs the state machine to transition to a succeeding state object in the process flow.

21. The software program product of claim 20, wherein said collection of state objects also jointly define the flow of an uninstall process, which is the exact reverse of the install process.

* * * * *